United States Patent [19]

Chen

[11] Patent Number: 5,694,998
[45] Date of Patent: Dec. 9, 1997

[54] ADJUSTABLE SUNSHADE FOR AUTOMOBILE

[76] Inventor: Zuoliang Chen, 47 Brighton Ave., San Francisco, Calif. 94112

[21] Appl. No.: 759,534

[22] Filed: Dec. 4, 1996

Related U.S. Application Data

[60] Provisional application No. 60/008,223 Dec. 5, 1995.

[51] Int. Cl.[6] ............................................. B60J 3/00
[52] U.S. Cl. ............................. 160/370.21; 160/327
[58] Field of Search ....................... 160/370.21, 327, 160/354, 368.1, 330, 340, 341, DIG. 2, DIG. 3; 296/97.7, 97.8, 138, 145

[56] References Cited

U.S. PATENT DOCUMENTS

| | | | |
|---|---|---|---|
| 2,496,910 | 2/1950 | Fridolph | 160/327 X |
| 2,528,848 | 11/1950 | Weinzimmer | 160/341 X |
| 2,782,849 | 2/1957 | Sadloski et al. | 160/330 |
| 4,230,171 | 10/1980 | Baker | 160/327 X |
| 4,335,773 | 6/1982 | Masi | 160/23 R |
| 4,374,536 | 2/1983 | Becker | 160/327 X |
| 4,448,005 | 5/1984 | Vochelli | 52/473 |
| 4,558,475 | 12/1985 | O'Brien | 160/327 X |
| 4,893,668 | 1/1990 | Nomura | 160/370.21 X |
| 4,929,014 | 5/1990 | Clark et al. | 296/97.8 |
| 5,042,866 | 8/1991 | Cody | 296/97.4 |
| 5,042,867 | 8/1991 | Crotty et al. | 296/97.8 |
| 5,046,543 | 9/1991 | Levy | 160/84.1 |
| 5,292,168 | 3/1994 | Mykytiuk et al. | 296/97.8 |
| 5,465,776 | 11/1995 | Mirza | 160/368.1 |
| 5,509,713 | 4/1996 | Hou | 160/330 X |

*Primary Examiner*—David M. Purol

[57] ABSTRACT

An adjustable automobile sunshade is constructed of a shade body connected to extension bars such that the size and shape of the sunshade can be changed to fit the sizes and shapes of different automobile windows to provide maximum shading effect.

2 Claims, 12 Drawing Sheets

ADJUSTABLE SUNSHADE FOR AUTOMOBILE

This application claims the benefit under 35 U.S.C. 119(e) of U.S. provisional application Ser. No. 60/008,223, filed on Dec. 5, 1995.

BACKGROUND

This invention relates generally to sunshades, and more particularly to sunshades for automobile windows. The device can be used to filter or block sun rays from entering through auto windows, thereby reducing glare and heat, and protecting the driver and passengers from the sun's harmful ultraviolet (UV) rays.

DESCRIPTION OF THE PRIOR ART

Since the invention of automobiles, all occupants, drivers and passengers alike, have been harmed by the undesirable sun rays. Commonly, the occupant's eyes are temporally blinded by the excess glare of the sun. Furthermore, the skin of the occupant may be harmed by the ultraviolet rays that is cancer-causing. Also, the automobile's interior and upholstery may be damaged by the sun rays to deteriorate quickly. Therefore, people have tried many different ways to block or filter the harmful sun rays to protect themselves from the harmful radiation, and also to keep their cars cooler and reduce deterioration. One significant disadvantage of the currently available sun shades is that they can not be adjusted to cover a particular auto window completely.

Known sunshades for automobiles generally fall into two categories: either inside (in-door) or outside (out-door) the automobile compartment. The out-door devices are comprised of an arcade semi-transparent member mounted along the upper portion of the front window, thus filtering and shading part of the interior of the automobile. However, due to the position of such shade device, it is only effective when the sun is at the higher part of its orbit. The in-door devices are either curtains or blinds that are permanently affixed to the side or rear window frames, or folding boards that are placed in the front windshield when a vehicle is parked. A common disadvantage of the various existing folding boards, curtains, blinds, and similar structures, is that the shading devices or shading bodies are usually rectangular in shapes and their width and shapes are not adjustable. Since automobile windows vary widely in different sizes and shapes, the rectangular, non-adjustable shades are limited in their effectiveness. Often the devices are too small for large windows, or too large to be fitted into small windows, or fit in such a way that they provide only partial coverage.

Many different types of automobile sunshades have been invented, but nearly all of them have limitations that are overcome by the present invention. U.S. Pat. No. 4,335,773 to Lamberto Masi on Jun. 22, 1982 discloses a kind of complex winding up sunshade curtain which has the following disadvantages:

(a) The width of the sunshade is fixed, thus limiting its shading effectiveness to those auto windows having the same width of the sunshade. If used on auto windows of other widths, coverage will be incomplete and/or inadequate.

(b) The shading body is rectangular in shape, thus limiting its shading effectiveness to those auto windows in rectangular shape, or providing incomplete and/or inadequate coverage in non-rectangular windows.

(c) The design is complex and costly in manufacturing.

(d) Excess mechanical parts increase the likelihood of failure. U.S. Pat. No. 5,046,543 to Abraham Levy (Sep. 10, 1991) discloses a kind of motor vehicle sunshield and poster systems which has the following disadvantages:

(a) The device is constructed of rigid sheet material and is rectangular in shape, and is designed to rest against the inside of the windshield, being held in place by two sun visors. Since the device does not fit the shape of the windshield, it does not provide complete coverage and the sun's ray will penetrate in the uncovered areas, causing damage to the interior of the vehicle and reducing the cooling effects of the shade.

(b) The device can not be used while the vehicle is in motion.

(c) The device is bulky and limited to use on the front windshield. It is not suited for use in side or rear windows.

(d) The device is not adjustable in size or shape.

Accordingly, there is a need for a sunshade whereby the width and shape are adjustable, such that the device can easily fit in all car windows to provide complete and adequate coverage. In addition, it will also be highly desirable that such a sunshade to be simple in construction, easy to install and operate, and low in cost. In addition, it is preferable that advertisements can be placed on the outside of the sunshade, thereby adding value to the product. Also, it is preferable that the unit be portable for easy handling and be carded to different locations such as in automobiles and in buildings, while requiring no tools to install. It is further desirable that the sunshade be lightweight, folds easily, and can be stored in the automobile in a small space.

ADVANTAGES

Accordingly, the advantages of the present invention are:

(a) The width and shape of the sunshade can be easily adjusted to fit a particular auto window;

(b) Creating height adjustment function by placing the lower extension bar on the lower portion of the shade body, instead of on the lower margin of the shade body, avoids complex and costly mechanical construction;

(c) Very flexible, yet simple and inexpensive to manufacture;

(d) The sunshade is very easy to use. It is not permanently affixed to a vehicle, and requires no tools to install it;

(e) The sunshade is lightweight, folds easily, and can be stored in automobile in a small space;

(f) Provides a space of approximately 13"×13" for advertising.

Further objects and advantages are to provide an adjustable sunshade for automobile which can be used easily and conveniently to filter or block sun ray and provide advertising space. Further objects and advantages will become apparent from a consideration of the ensuing description and drawings.

REFERENCE NUMERALS IN DRAWINGS

1 Shade body
2 upper extension bar
3 lower extension bar
4 fixing button
5 main area
6 upper area
7 lower area
8 wing
9 suction cup
10 advertisement
11 shade fabric
11a upper shade fabric fixing hole
11b lower shade fabric fixing hole
12 shell fabric
12a upper hollow shell
12b lower hollow shell
12c upper hollow shell fixing hole
12d lower hollow shell fixing hole
13 middle part
13a upper middle part fixing hole
13b lower middle part fixing hole
14 wing fabric
14a upper wing fabric fixing hole
14b lower wing fabric fixing hole
15 extension bar base
15a T-shaped groove
15b teeth
15c fixing stick
16 sliding strip
16a sliding snap button
16b positioning spring
22c sliding strip fixing hole
31 window glass
32 window frame

DETAILED DESCRIPTION OF THE DRAWINGS

Figure 1:
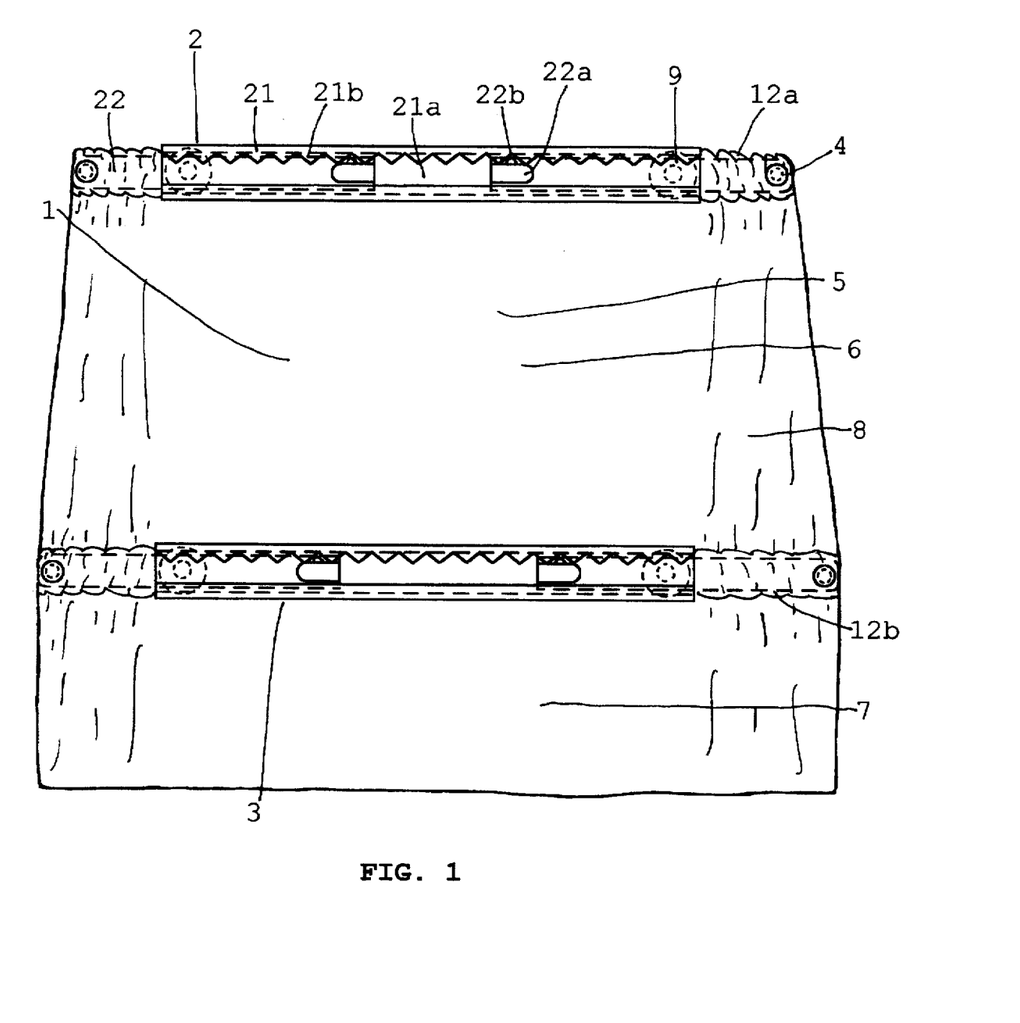
FIG. 1 shows the rear view of a semi-extended adjustable sunshade.

A typical embodiment of the adjustable sunshade of the present invention is illustrated in FIG. 1 (rear view). The adjustable sunshade is mainly constructed of one shade body 1, one upper extension bar 2, one lower extension bar 3(the upper and lower extension bars are identical in size and structure), and two or four suction cups 9.

The shade body 1 is made of opaque or semi-transparent material such as nylon fabric, cotton fabric, tinted film, etc. The shade body 1 may be constructed in a number of different ways.

Figure 2:
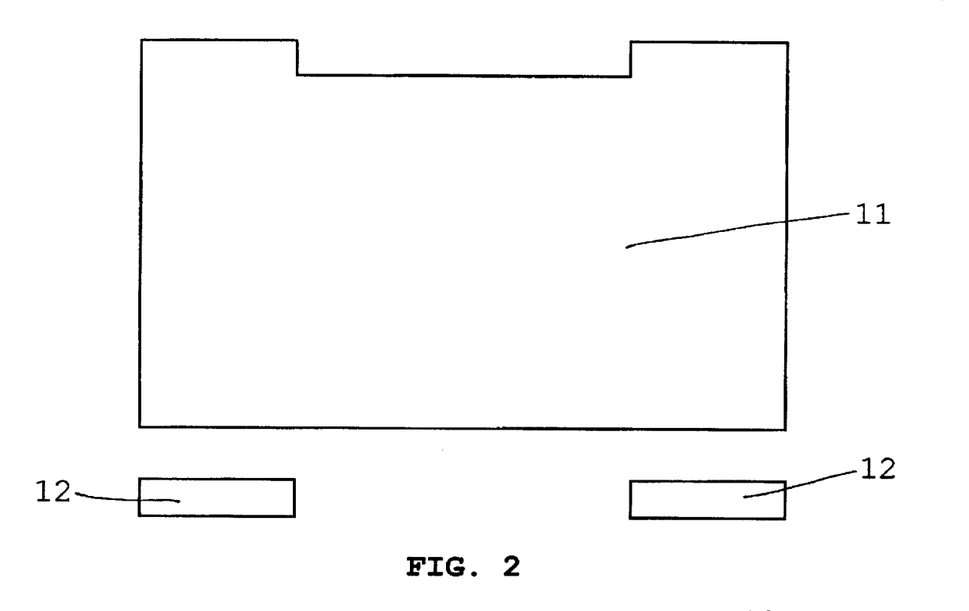
FIG. 2 shows a piece of shade fabric with two pieces of shell fabric.
Figure 3:
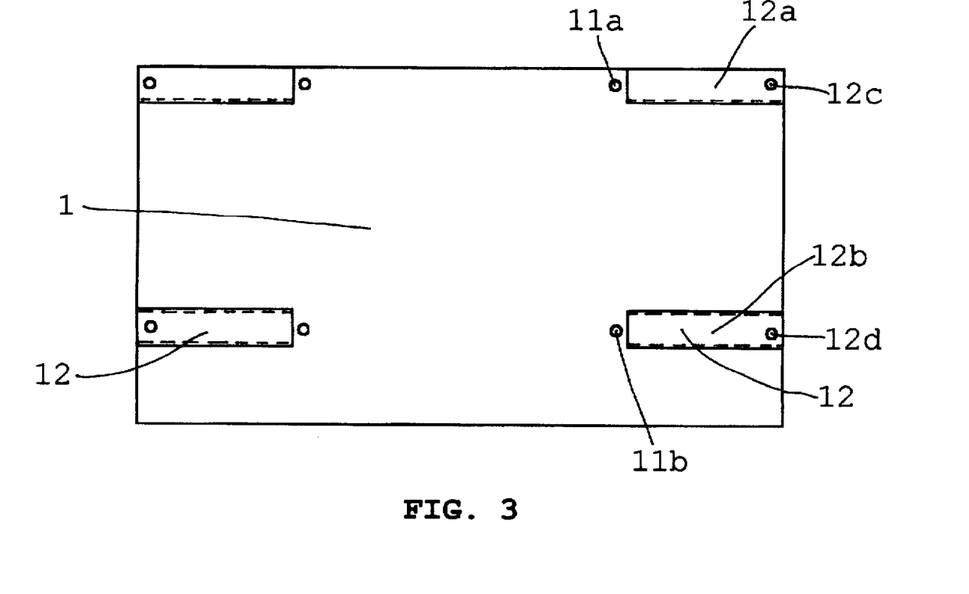
FIG. 3 shows the rear view of a finished shade body.
Figure 3A:
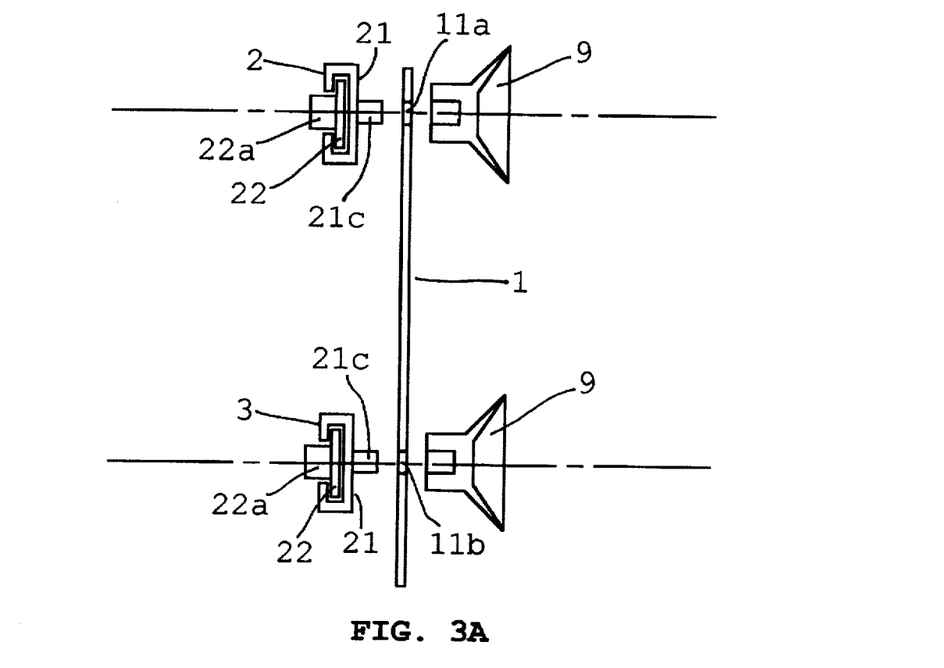
FIG. 3A shows one of the cross-sectional view from FIG. 9.
Figure 3B:
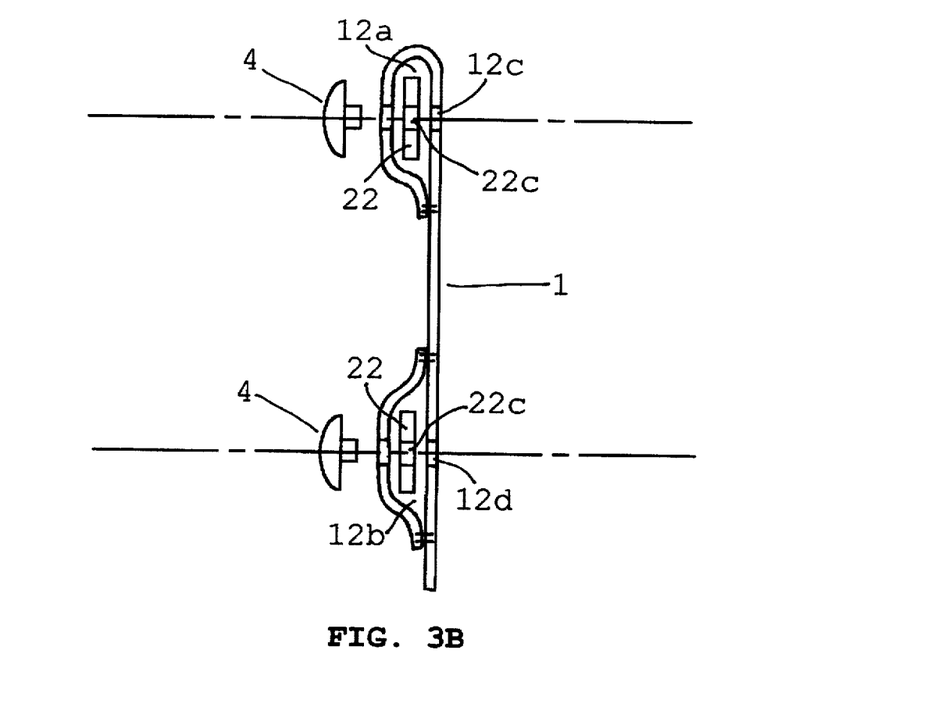
FIG. 3B shows one of the cross-sectional view from FIG. 9.
Figure 11:
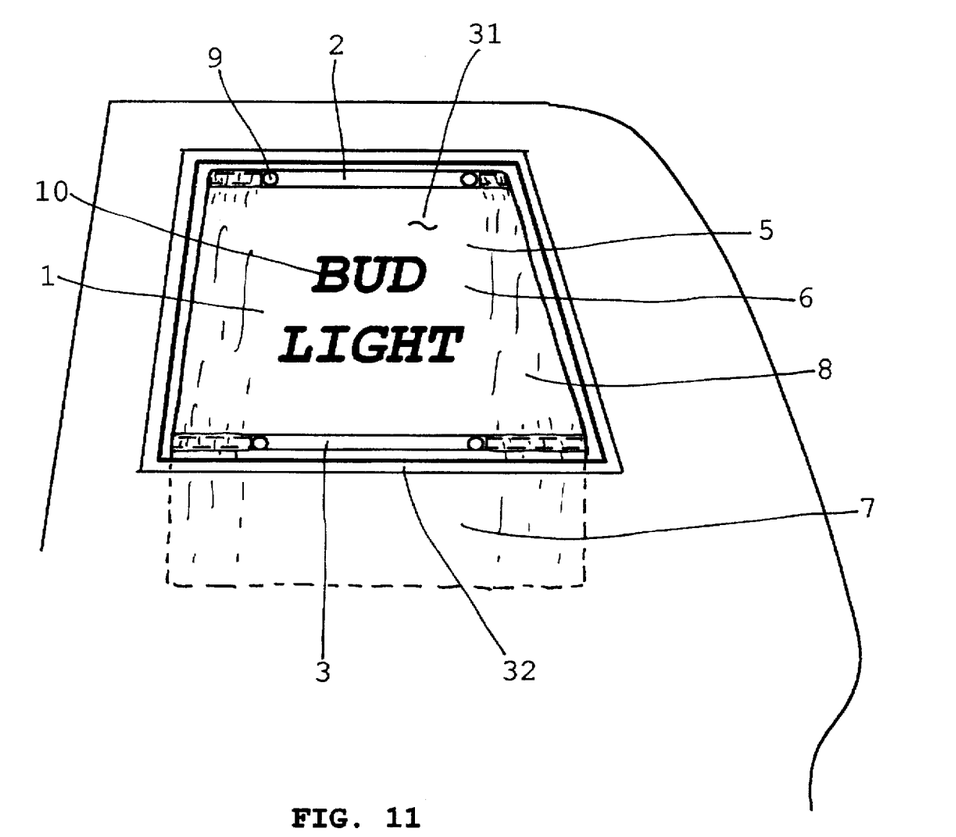
FIG. 11 shows a sunshade installed on a short auto window, with its lower area overlapping on window's lower frame.

In the first embodiment, the shade body 1 is made from a whole piece of flexible material capable of blocking or filtering sun glare, heat and UV rays, i.e. nylon, polyester, cotton, etc. To fabricate the shade body 1, first cut a large piece of shade fabric 11 and two pieces small shell fabric 12 as shown in FIG. 2. The overall dimension of the shade fabric 11 is approximately 25" wide and 21" high. The dimension of the shell fabric 12 is about 6" wide and 1" high, capable of forming a lower hollow shell 12b large enough to accommodate a sliding strip 22. The width of the opening on the middle top margin portion of the shade fabric 11, is equal to the width of an extension bar base 21, which is approximately 13". The height of the opening is approximately 1". The width of the projected portion on the shade fabric 11 is approximately 6". After preparation of the shade fabric 11 and the shell fabric 12, the two projected portions on the top of the shade fabric 11 are bent backward and sewn onto the shade fabric 11 along their longitudinal edges to form two upper hollow shells 12a. Next, the two shell fabrics 12 are placed on the lower portion of the shade fabric 11, parallel to the upper hollow shells 12a, at a distance approximately 13". The top and bottom edges of the two shell fabrics 12 are then sewn onto the shade fabric 11 along their longitudinal edges to form two lower hollow shells 12b, as shown in FIG. 3, 3B. The distance between the upper hollow shell 12a and the lower hollow shell 12b is approximately 13". Upper and lower shade fabric fixing holes 11a, 11b, upper and lower hollow shell fixing holes 12c, 12d are punched in locations as shown in FIG. 3. A finished shade body 1 is as shown in FIG. 3, 3A, 3B. After construction of the shade body 1, advertisement 10 can be printed or attached on the front or rear side of the shade body 1 as shown in FIG. 11, 12.

Figure 4:
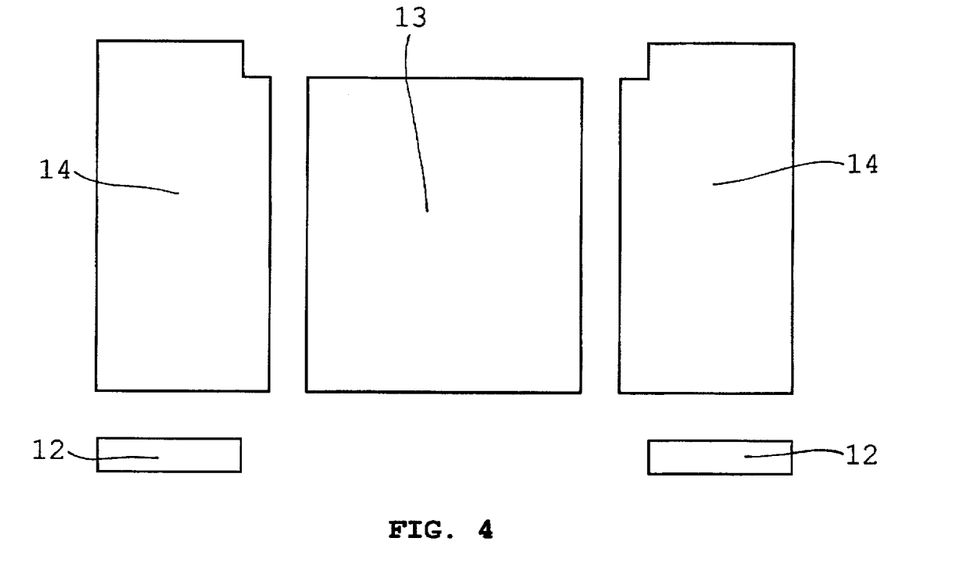
FIG. 4 shows one piece of middle part, with two pieces of wing fabric and two pieces of shell fabric.
Figure 5:
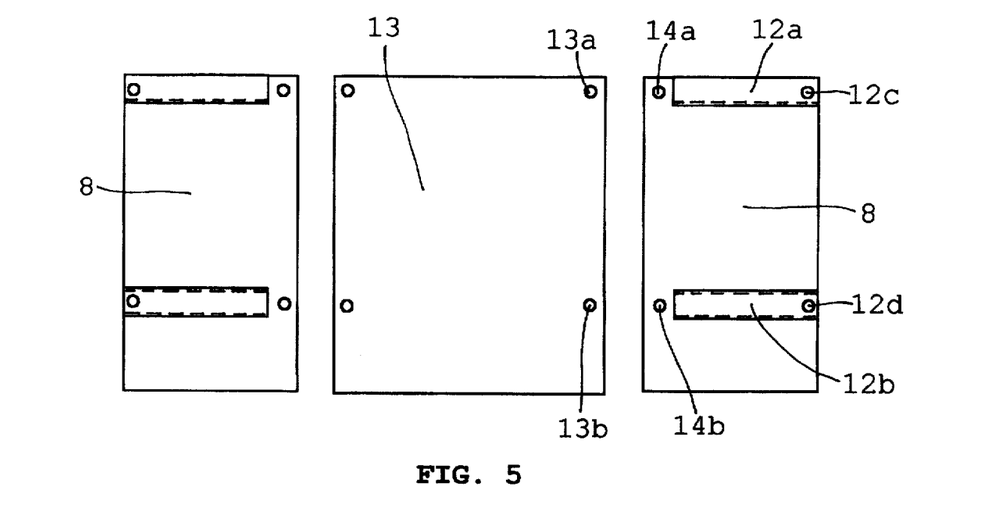
FIG. 5 shows the rear view of one finished middle part and two wings.

In another embodiment, the shade body 1 is made from one piece middle part 13 and two pieces wing fabric 14 as shown in FIG. 4. The middle part 13 and wing fabric 14 are of different materials. For example, middle part 13 may be made of tinted film, with two wing fabrics 14 made of elastic fabric like polyester, nylon, cotton, etc. To fabricate the shade body 1, first cut a piece of middle part 13, two pieces of wing fabric 14, and two pieces of shell fabric 12 as shown in FIG. 4, then the projected portions on the top of the wing fabrics 14 are bent backward and sewn onto the wing fabrics 14 along their longitudinal edges to form the two upper hollow shells 12a. Next, the two shell fabrics 12 are placed on the lower portion of the wing fabrics 14, parallel to the upper hollow shells 12a, at a distance of about 13". The top and bottom edges of the two shell fabrics 12 are then sewn onto the wing fabrics 14 along their longitudinal edges to form the two lower hollow shells 12b, as shown in FIG. 5, 5B. The distance between the upper hollow shell 12a and the lower hollow shell 12b is approximately 13". Upper and lower middle part fixing holes 13a, 13b, upper and lower hollow shell fixing holes 12c, 12d are punched in locations as shown in FIG. 5.

Figure 6:
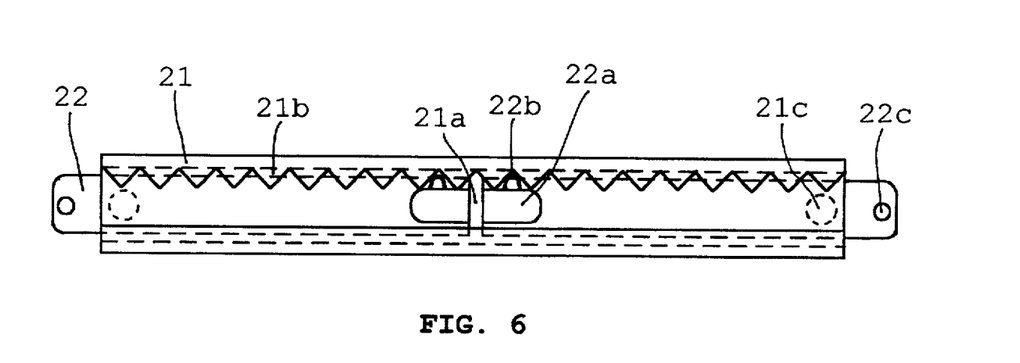
FIG. 6 shows the rear view of an extension bar, with both sliding strips in the fully retracted position.
Figure 7:
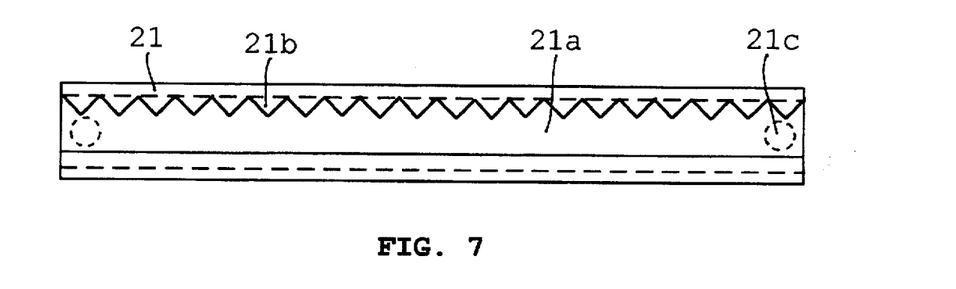
FIG. 7 shows the rear view of an extension bar base.
Figure 7A:
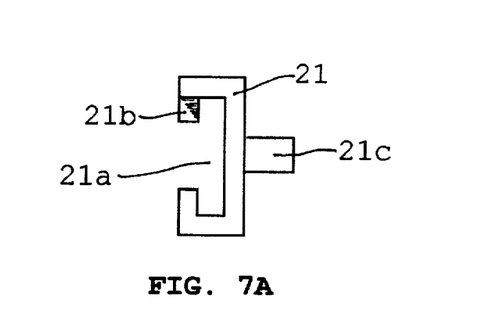
FIG. 7A shows the side view of an extension bar base.
Figure 8:
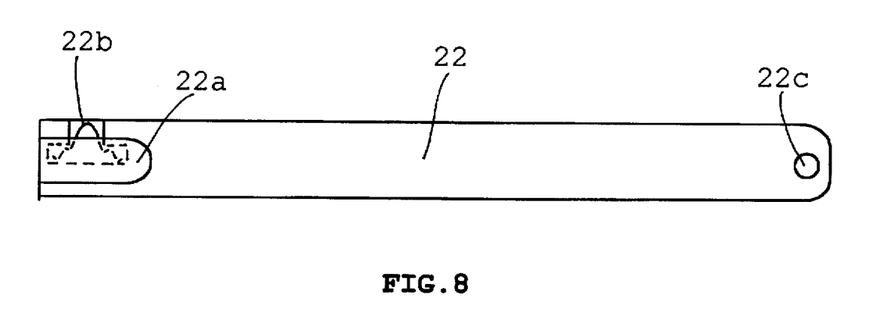
FIG. 8 shows the front view of a sliding strip.
Figure 8A:
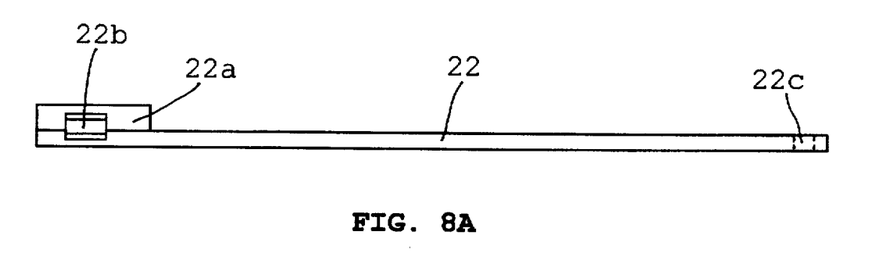
FIG. 8A shows the top view of a sliding strip.

An extension bar 2 or 3, as shown in FIG. 6, is constructed of one extension bar base 21, and two pieces of sliding strip 22. The extension bar base 21, as shown in FIGS. 7, 7A, is made of hard plastic like ABS, and has a T-shaped longitudinal groove 21a along its middle portion. One edge of the T-shaped groove 21a has teeth, and the other edge is smooth. The sliding strip 22, as shown in FIG. 8, 8A, is also made of hard plastic with a projected sliding snap button 22a on top of one end, and a fixing hole 22c on the other end. There is a positioning spring 22b inside the sliding snap button 22a. When force is applied on the head of the spring 22b, the head of the spring 22b is pushed inside the sliding snap button 22a, thus allowing the sliding strip 22 to slide along the T-shaped groove 21a in the extension bar base 21. The extension bar 2 or 3, as shown in FIG. 6, is assembled by sliding one sliding strip 22 from the right, another one from the left into the T-shaped groove 21a, with the end containing the snap button 22a going in first. Both snap buttons 22a will be slid all the way to the middle of the extension bar base 21, which is the original position of the extension bar with no extension on both sides. When the snap buttons 22a is pushed along the T-shaped groove 21a, the head of the spring 22b is forced into the hole in the snap button 22a, thus allowing the sliding strip 22 to slide along the T-shaped groove 21a to change the overall width of the extension bar 2 or 3. Thus the overall size and shape of the shade body 1 can be changed by properly adjusting the four sliding snap buttons 22a. When the snap button 22a is not pushed, the positioning spring 22b is positioned between two teeth 21b, holding the sliding strip 22 in a relatively secure position, thus forming the shade body 1 into a relatively secure shape.

Figure 9:
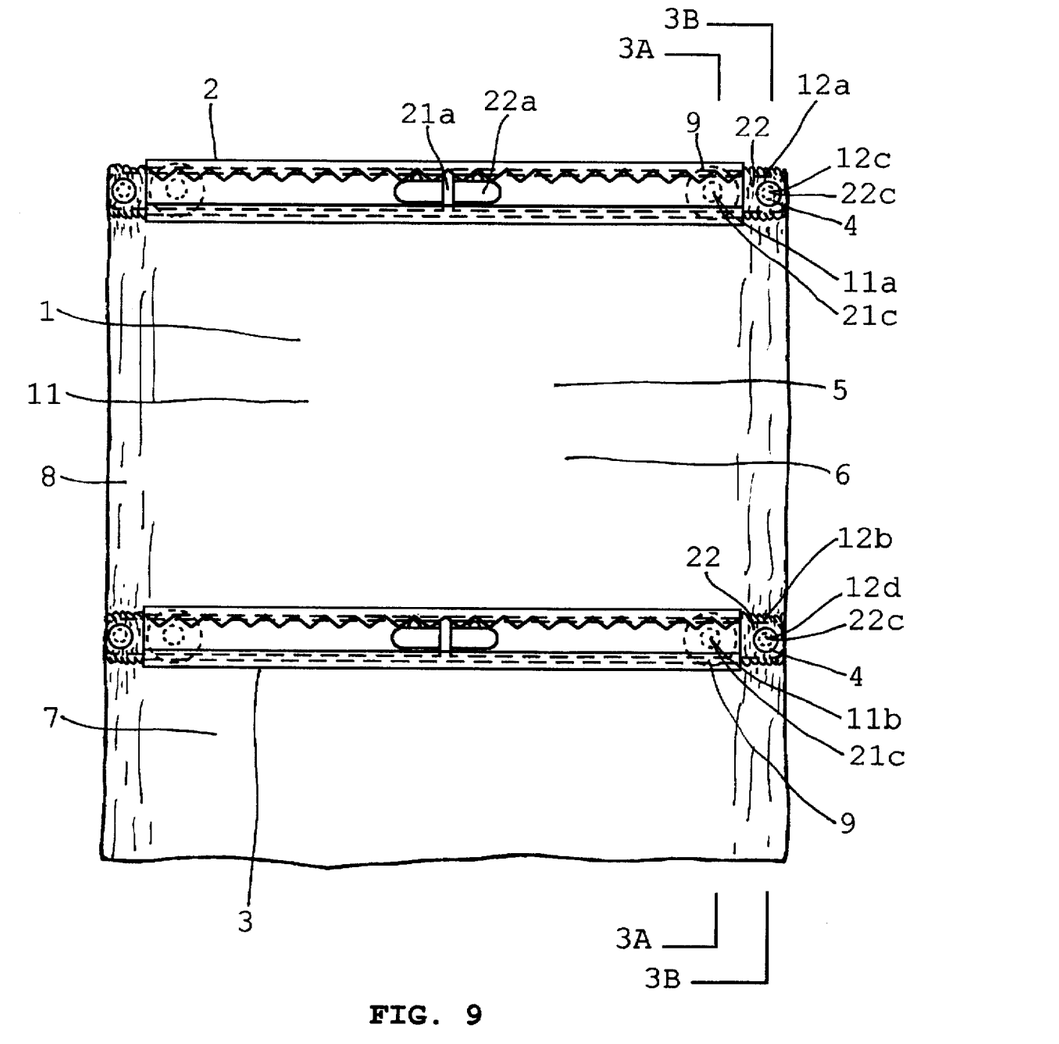
FIG. 9 shows the rear view of a sunshade made from a piece of shade fabric, with its sliding strips at the original retracted position.

Each embodiment is assembled as follows:

In the first embodiment, as shown in FIG. 9 and FIGS. 3A, 3B, the upper extension bar 2 is placed on the top margin of the shade body 1, between the two upper hollow shells 12a, with fixing sticks 21c going through the upper shade fabric fixing holes 11a. The front side of the extension bar base 21 is then attached to the rear side of the shade body 1, and two sliding strips 22 are extended through the two upper hollow shells 12a. The far ends of the sliding strips 22 are fastened to the two upper corners of the shade body 1 by buttoning fixing buttons 4 through the upper hollow shell fixing holes 12c, and sliding strip fixing holes 22c. The lower extension bar 3 is placed substantially horizontal on the shade body 1 between the two lower hollow shells 12b, with the fixing sticks 21c going through the lower shade fabric fixing holes 11b, then the front side of the extension bar base 21 is attached to the rear side of the shade body 1, then the two sliding strips 22 are extended through the two lower hollow shells 12b, the far ends of the sliding strips 22 are then fastened to the two outer edges of the shade body 1 by buttoning fixing buttons 4 through the lower hollow shell fixing holes 12d and sliding strip fixing holes 22c. Preferably, four suction cups 9 are affixed to the fixing sticks 21c.

Figure 5A:
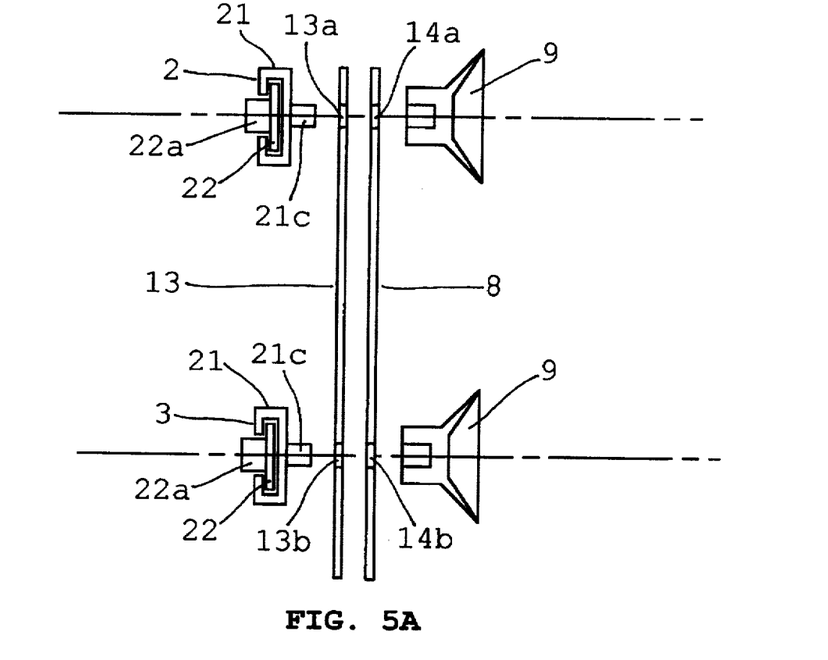
FIG. 5A shows one of the cross-sectional view from FIG. 10.
Figure 5B:
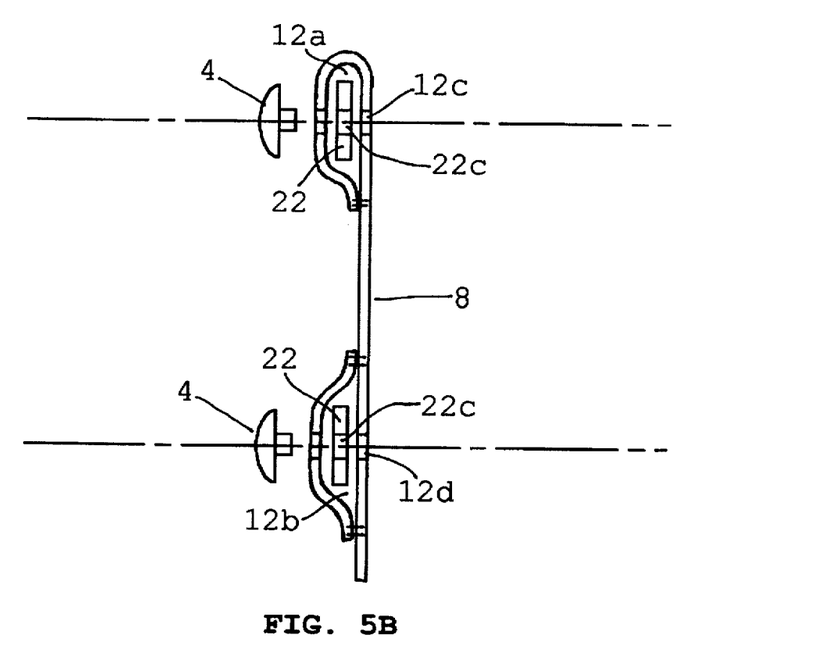
FIG. 5B shows one of the cross-sectional view from FIG. 10.
Figure 10:
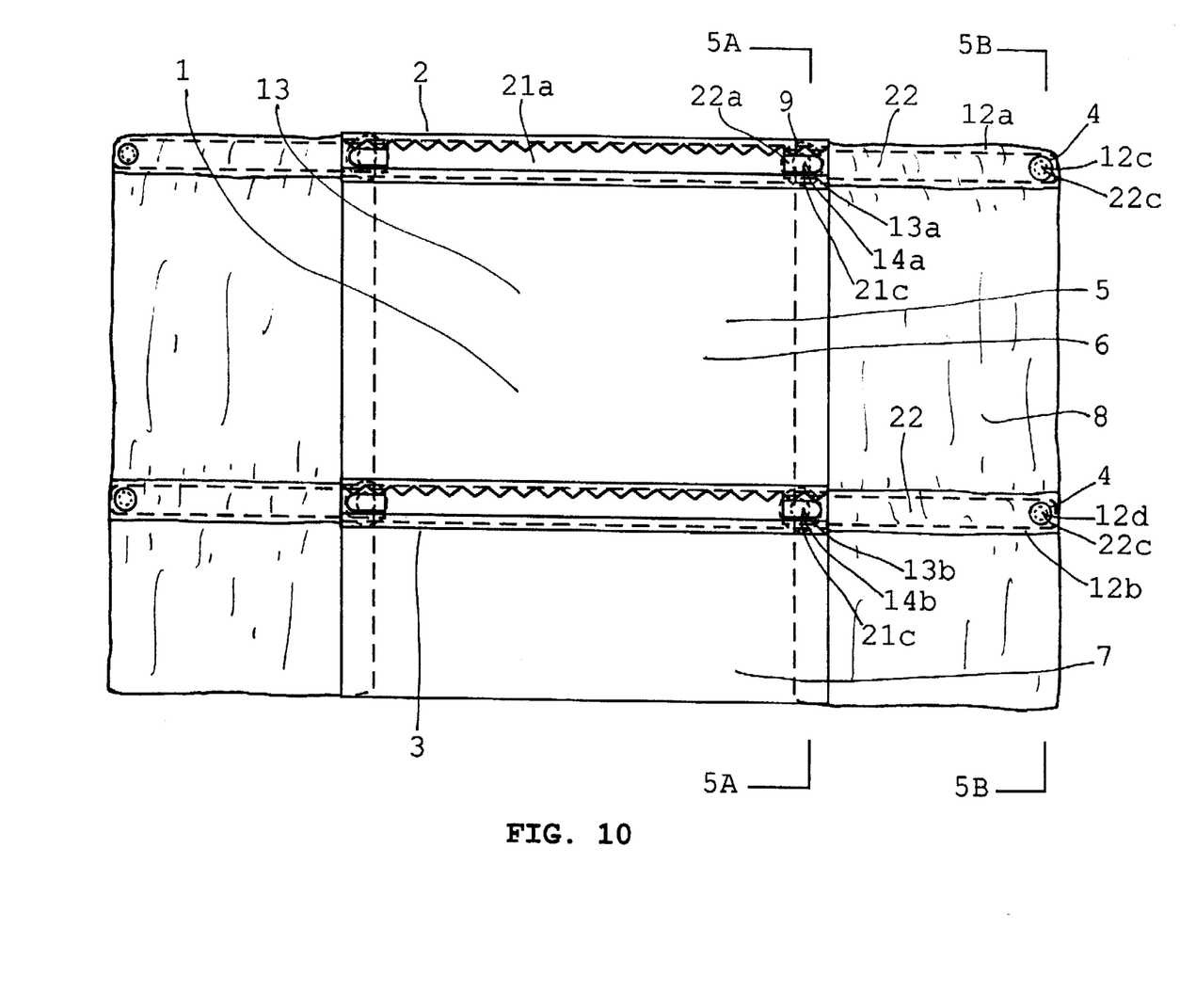
FIG. 10 shows the rear view of a sunshade made from middle part and wing fabrics, with its sliding strips at the fully extended position.

In the second embodiment, as shown in FIG. 10 and FIGS. 5A, 5B, the upper extension bar 2 is placed on the top margin of the middle part 13, with fixing sticks 21c going through the upper middle part fixing holes 13a and the upper wing fabric fixing holes 14a. The front side of the extension bar base 21 is then attached to the rear side of the middle part 13, and two sliding strips 22 are extended through the two upper hollow shells 12a on the wing 8. The far ends of the sliding strip 22 are fastened to the two upper corners of the wings 8 by buttoning fixing buttons 4 through the upper hollow shell fixing holes 12c, and sliding strip fixing holes 22c. Next, the lower extension bar 3 is placed substantially horizontal on the middle part 13 between the two lower hollow shells 12b on the wing 8, with fixing sticks 21c going through the lower middle part fixing holes 13b and the lower wing fabric fixing holes 14b, the front side of the extension bar base 21 is then attached to the rear side of the middle part 13, then two sliding strips 22 are extended through the two lower hollow shells 12b on the wing 8. The far ends of the sliding strips 22 are then fastened to the two outer edges of the wings 8 by buttoning fixing buttons 4 through the lower hollow shell fixing holes 12d and sliding strip fixing holes 22c. Preferably, four suction cups 9 are affixed to the fixing sticks 21c.

For better understanding of the present invention, we may classify a finished sunshade into several areas as follows:

(a) The main area 5—as shown in FIG. 1, 9, 10, the area between the upper and lower extension bar base, preferably, the dimension is approximately 13" wide and 13" high.

(b) The upper area 6—the area between the upper extension bar 2 and the lower extension bar 3, which has a minimum retracted width of about 14", and a height of about 13" as shown in FIG. 9, and is extendable to a maximum extended width of about 25" and a height of about 13" as shown in FIG. 10, the size and shape of this area is changeable and provide additional shading coverage for a window larger than about 14" in width.

Figure 12:
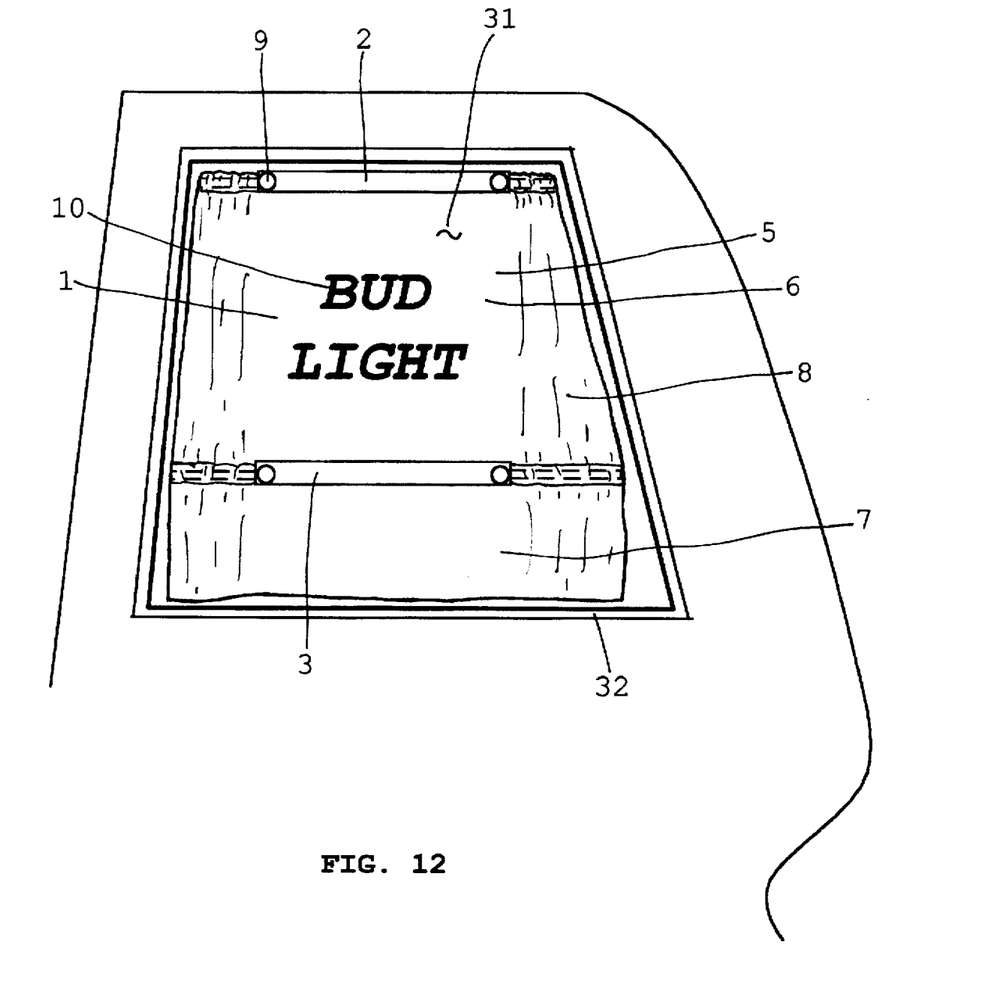
FIG. 12 shows a sunshade installed on a high auto window, with its lower area covering the lower portion of the window.

(c) The lower area 7—the area from the lower extension bar 3 to the bottom of the shade body 1, which has a minimum retracted width of about 14", and a minimum height of about 6" as shown in FIG. 9. This area is extendable and has a maximum extended width of about 25", and a maximum height of about 6" as shown in FIG. 10. The size and shape of this area is changeable, and its function is as a means of height adjustment, providing additional shading coverage for a window higher than about 13". The reason for placing the lower extension bar 3 on the lower portion of the shade body 1, with a distance of about 13" to the upper extension bar 2, instead of on the lower margin of the shade body 1, is because most auto windows 31 are having a height in excess of about 13", and when the suction cups on the upper extension bar 2 are applied on the top margin of the window glass 31, this allows the suction cups on the lower extension bar 3 to be applied on the lower portion of the window glass 31. The reason for placing the lower extension bar 3 on the lower portion, instead of on the lower margin of the shade body 1, is to use the lower extension bar 3 to form a lower area 7 as a means of height adjustment. If the lower extension bar 3 was placed on the lower margin, in order to allow the suction cups on the lower extension bar 3 to be applied on the window glass 31 on most vehicles, the height of shade body 1 is very limited and can not provide enough coverage on higher windows. The lower extension bar 3 is placed on the lower portion of the shade body 1 with a distance approximately 13" between the upper extension bar 2, this will insure that the suction cups on the lower extension bar 3 can be applied on the window glass 31, and the lower area 7 will have the height adjustment function. When the window is shorter than the height of the shade body 1, the lower area 7 simply overlaps the lower window frame 32 as shown in FIG. 11. If the window is higher than about 13", the lower area 7 can provide extra shading coverage as shown in FIG. 12.

(d) The wings 8—the two wings on each side of the sunshade, which are areas from the upper extended sliding strip, lower extended sliding strip, to the bottom of shade body 1, and have a height of approximately 20". The wings 8 can be adjusted from a minimum retracted width of approximately 1", to a maximum extended width of approximately 7", as shown in FIG. 9 and FIG. 10. The adjustment is made by sliding the four sliding snap buttons 22a along the T-shaped groove 21a on the extension bar base 21. The wings function mainly as a width and shape adjustment for the sunshade.

Figure 13:
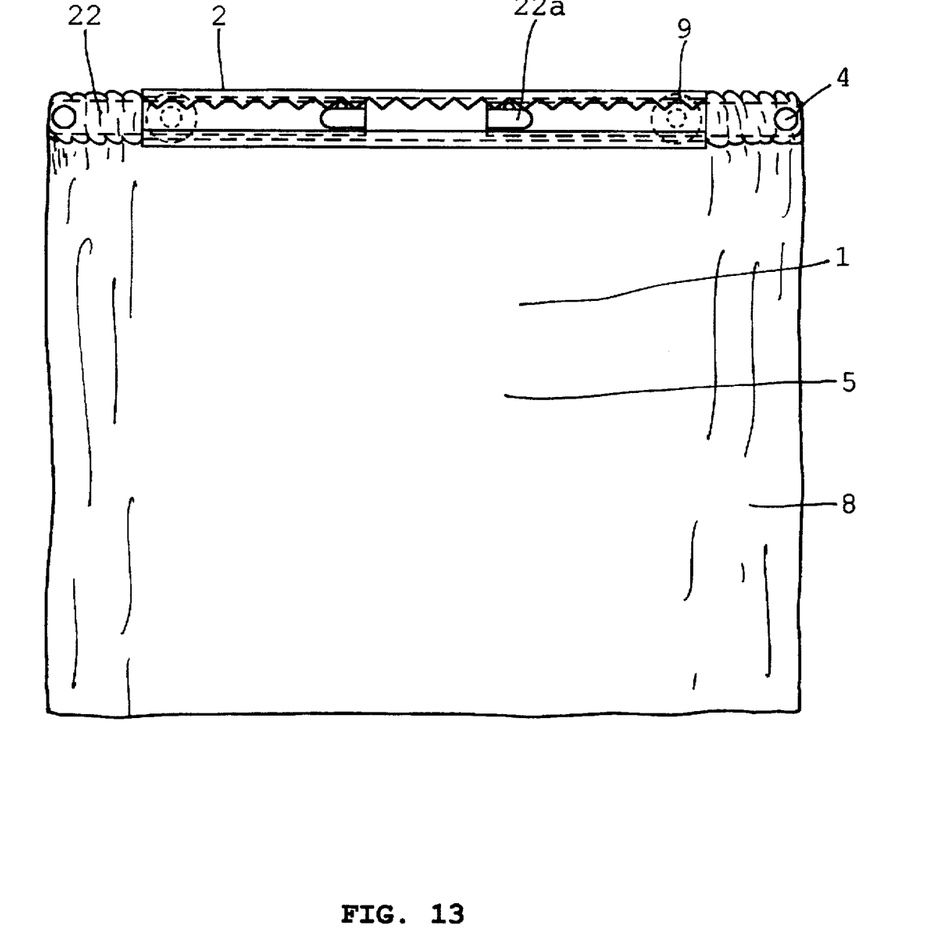
FIG. 13 shows the rear view of a sunshade with only top extension bar.

Additional embodiment is shown in FIG. 13, in which only top extension bar is used, this kind of sunshade is suitable for regular rectangular-shaped windows.

OPERATION

The manner of using the present invention is very simple. As shown in FIGS. 11, 12. First, place the upper extension bar 2 along the top margin of the window glass 31, attach the upper suction cups against the window glass 31, then align the lower extension bar 3 to the lower portion of window glass 31, attach the lower suction cups on to the window glass 31. Thus, the suction cups 9 can hold the sunshade on the window 31, then push the four sliding snap buttons forward or backward to adjust the width and shape of the sunshade to match the width and shape of the window. We may store the sunshade in two ways:

(a) Remove the sunshade from window glass 31, and put it away, or (b) Remove only the upper suction cups, and allow the upper area 6 to naturally fall down along the lower extension bar 3. In this way, the whole sunshade is still held on to the window glass 31 by suction cups on the lower extension bar 3. This is a convenient method of temporary storage for the sunshade, and it can be put back on the window glass very easily and quickly.

SUMMARY, RAMIFICATION, AND SCOPE

This invention uses multiple pieces of extension bar to adjust the width and shape of the shade body to match the size and shape of a particular window. To provide maximum shading effect, its width can be adjusted from about 14" to about 25", thus overcoming the major disadvantage of the current existing non-adjustable sunshade. By simply placing the lower extension bar on the lower portion, instead of on the lower margin of the shade body, to create the height adjustment function, so the presented invention is actually adjustable in width and height, thus providing maximum shading effect for windows in different size and shapes.

When an advertisement is printed on or attached to the from side or inside of the sunshade, it become a poster-sunshade and can be easily used to block sun ray and advertise simultaneously. Because its construction is very simple and the manufacturing cost is low, this invention provides a new, very cost-effective means of advertising. This means of advertising can also be quite effective, in that wherever an automobile goes, the advertising goes.

Although the description above contains many specificities, these should not be construed as limiting the scope of the invention but as merely providing illustrations of some of the presently preferred embodiments of this invention. For example, the sunshade or its related components can have some changes in size, structures, material, or different combination of material to make shade body 1, middle part 13, wing 8, extension bars 2 & 3, sliding strips 22, etc. Other dimensions may be used for windows of substantially different in size or shape from the ordinary passenger car windows. In some cases, the lower extension bar 3 can be placed on the lower margin of the shade body 1. Thus the scope of this invention should be determined by the appended claims and their legal equivalents, rather than by the examples given.

What is claimed is:

1. A sunshade comprising:

(a) a shade body having sufficient size to cover a window;

(b) an upper extension bar and a lower extension bar, each comprising one extension bar base and two sliding strips;.

wherein a longitudinal groove is substantially mounted in a middle portion along a length of the extension bar base; wherein each of the sliding strips having a fixing device located at an outer end, and a snap button attached at an inner end; wherein the sliding strips are disposed within the longitudinal grooves, and can slide along the longitudinal grooves;

wherein the upper extension bar and the lower extension bar being displaced substantially parallel to each other, and a top middle portion of the shade body is attached to the extension bar base of the upper extension bar, and a lower middle portion of the shade body is attached to the extension bar base of the lower extension bar;

wherein the fixing devices on the sliding strips are affixed to the outer edges of the shade body, so that an extension of the sliding strips will cause the extension of the shade body to a desired length and shape;

(c) means of attaching the sunshade to a window.

2. A sunshade comprising:

(a) a shade body having sufficient size to cover a window;

(b) an extension bar comprising one extension bar base and two sliding strips;

wherein a longitudinal groove is substantially mounted in a middle portion along a length of the extension bar base; wherein each of the sliding strips having a fixing device located at an outer end, and a snap button attached at an inner end; wherein the sliding strips are disposed within the longitudinal groove, and can slide along the longitudinal groove;

wherein a top middle portion of the shade body is attached to the extension bar base of the extension bar, and the shade body hangs below the extension bar;

wherein the fixing devices on the sliding strips are affixed to the outer edges of the shade body, so that an extension of the sliding strips will cause the extension of the shade body to a desired length;

(c) means of attaching the sunshade to a window.

\* \* \* \* \*